W. VAN NIEUWKERK & T. GUTCHEIS.
SPRING WHEEL.
APPLICATION FILED APR. 1, 1911.
1,000,645.
Patented Aug. 15, 1911.
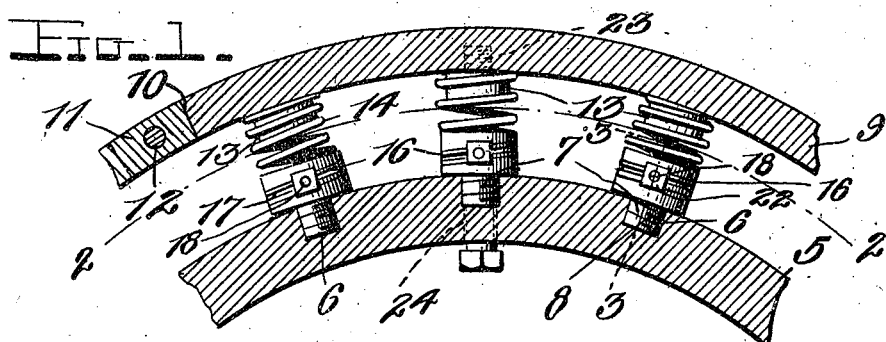
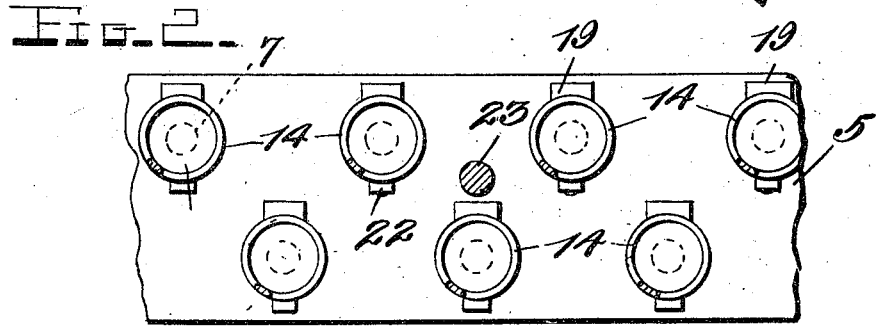
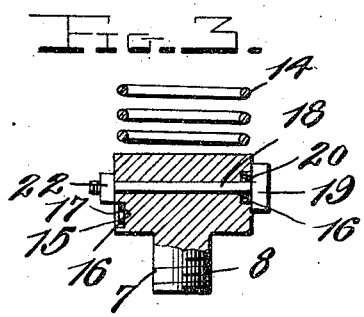
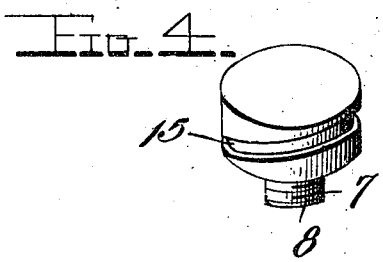
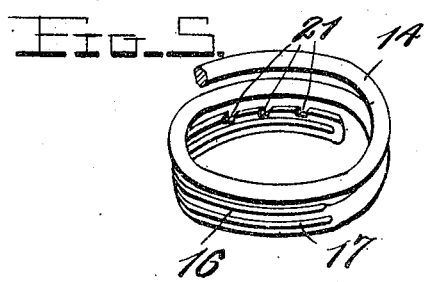
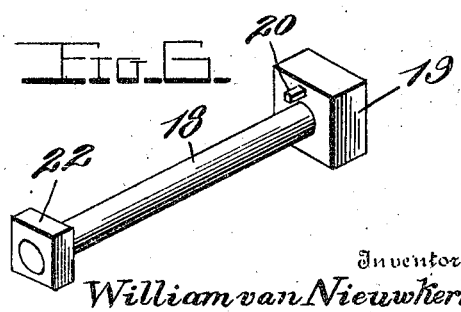
Inventors
William van Nieuwkerk
and Theodore Gutcheis,
Witnesses
Chas. L. Griesbauer.
L. G. Ellis.
By Watson E. Coleman
Attorney

UNITED STATES PATENT OFFICE.

WILLIAM van NIEUWKERK AND THEODORE GUTCHEIS, OF PASSAIC, NEW JERSEY.

SPRING-WHEEL.

1,000,645.

Specification of Letters Patent. Patented Aug. 15, 1911.

Application filed April 1, 1911. Serial No. 618,327.

*To all whom it may concern:*

Be it known that we, WILLIAM VAN NIEUWKERK and THEODORE GUTCHEIS, citizens of the United States, residing at Passaic, in the county of Passaic and State of New Jersey, have invented certain new and useful Improvements in Spring-Wheels, of which the following is a specification, reference being had to the accompanying drawings.

This invention relates to spring wheels and has for its object to provide a simple, inexpensive and efficient resilient wheel, and one which is admirably adapted for automobiles and similar vehicles.

A further object of the invention is to provide a resilient tire for vehicle wheels, and means whereby the resiliency of the tire may be readily adjusted in accordance with the load to be carried by the vehicle.

A still further object of our invention is to provide a plurality of circular series of coiled springs between the rim and tread of the wheel, the springs in one series being arranged in staggered relation to those in the adjacent series, and means for securing the springs to the rim of the wheel whereby they may be readily removed and replaced by others when broken.

With the above and other objects in view, the invention consists of the novel features of construction, combination and arrangement of parts hereinafter fully described and claimed, and illustrated in the accompanying drawings, in which—

Figure 1 is a longitudinal section of a fragment of the rim and tread of a wheel illustrating our invention; Fig. 2 is a section taken on the line 2—2 of Fig. 1; Fig. 3 is an enlarged detail section taken on the line 3—3 of Fig. 1; Fig. 4 is a detail perspective view of one of the removable heads arranged in the rim of the wheel to which the springs are adjustably attached; Fig. 5 is a similar view of a portion of one of the springs; and Fig. 6 is a detail perspective view of the spring fastening bolt.

The present invention is devised with a view to providing means whereby the resiliency of wheel tires such as are commonly used upon motor driven trucks or other vehicles may be readily adjusted or regulated. To this end, the rim 5 of the vehicle wheel is provided with a plurality of threaded sockets 6 which are adapted to receive the heads or studs 7 which are formed with the reduced screw threaded portion 8 for engagement in said sockets. These threaded sockets are preferably arranged in parallel longitudinal series and extend throughout the circumferential extent of the wheel rim. The stud or head receiving sockets in one of said longitudinal series are, however, arranged in staggered relation with regard to the sockets of the adjacent series.

A metallic tread plate 9 is arranged in spaced, normally concentric relation to the wheel rim and the ends of said tread plate are provided with the mortises and tenons 10 and 11 respectively for interfitting engagement and a transverse bolt 12 extends through the same whereby the ends of the tread plate are securely joined. Upon the under side of the tread plate which is opposed to the wheel rim, a plurality of circular series of cylindrical lugs 13 are rigidly secured by means of suitable bolts, screws or other analogous fastening means. These lugs are arranged in staggered relation in a similar manner to the removable heads or studs 7, and are disposed in line therewith as clearly shown in Fig. 1.

Between the rim of the wheel and the tread plate 9, the metallic springs 14 are arranged, and are adjustably secured to the heads or studs 7 at one of their ends and have their other ends disposed about the cylindrical lugs 13 arranged on the tread plate, and in engagement with said tread plate. Each of the heads 7 is provided in its periphery with a spiral rectangular groove or channel 15 to receive the flattened end portion 16 of the spring. This flattened end of the spring is provided with a longitudinal slot 17 to receive the shank of the bolt 18 which is transversely disposed through the head 7. One end of the bolt shank is headed as indicated at 19, such bolt head being of greater diameter than the width of the spiral groove 15. A lug 20 is integrally formed upon one face of the bolt head 19 and projects into the spiral groove 15. This lug is adapted to engage in one of a plurality of spaced notches 21 which are provided in the upper longitudinal edge of the rectangular end portion of the cushioning spring. A nut 22 is threaded on the other end of the bolt shank to secure the same in the removable head or stud 7. By means of this construction it will be readily observed that the tension of the cushioning springs may be easily and quickly adjusted by simply loosening the bolt 18 so that the lug 20 thereof may be withdrawn from the notch 21 of the spring in which it is seated. The end of the spring may then be moved in the spiral groove 15 to arrange the coils of the springs in closer relation, thereby increasing the tension of the springs or separate the coils to reduce the pressure of the springs upon the metallic tread plate 9. It will thus be obvious that the resiliency of the wheel tire may be easily and quickly removed and replaced by another by simply removing the bolt 18, and detaching the stud 7 from the rim of the wheel. The new spring may then be properly fitted to the stud or head 7 and said head again placed in position.

Bolts 23 are securely fixed at one of their ends in the metallic tread plate 9 and have their other ends loosely disposed through the openings 24 in the rim and felly of the wheel. Two of these connecting bolts are preferably employed and are arranged at diametrically opposite points. These bolts effectually prevent any circumferential movement of the metallic tread plate with relation to the rim of the wheel.

From the foregoing it is believed that the construction and operation of our improved spring wheel will be readily understood. The device is comparatively simple, inexpensive in construction and highly efficient in practical operation. Owing to the accessibility of the cushioning springs and the easy manner in which they may be removed and replaced, the cost of repairs to a wheel of this character is thus reduced to a minimum. The device is also extremely durable and by providing the adjustable tensioning springs it will be seen that it can be applied to any of the various forms of vehicles irrespective of the use for which they are designed.

While we have shown and described the preferred form and construction of the various parts, it will be understood that the device is susceptible of considerable modification without departing from the essential feature or sacrificing any of the advantages thereof.

Having thus described the invention what is claimed is:—

1. The combination with the rim of a wheel, of a plurality of studs having threaded engagement in the wheel rim, each of said studs being provided with a spiral groove, coiled springs having rectangular end portions disposed for movement in said grooves, the other ends of the springs bearing against the tread of the wheel, said rectangular end portions being longitudinally slotted, bolts disposed through said studs and the slots of said springs and provided with nuts on one of their ends, and means formed on the heads of the bolts engaging said springs to secure the same against longitudinal movement in said spiral grooves.

2. The combination with the rim of a wheel, of a plurality of studs having threaded engagement in the wheel rim, each of said studs being provided with a spiral groove, coiled springs having rectangular end portions disposed in said grooves, the other ends of the springs engaging the tread of the wheel, said rectangular end portions having longitudinal slots and spaced notches in one of their edges, bolts transversely disposed through said studs having nuts threaded on one of their ends, and lugs formed on the bolt heads to be received in the notches of the springs to secure the springs in said spiral grooves and prevent their longitudinal movement.

In testimony whereof we hereunto affix our signatures in the presence of two witnesses.

WILLIAM van NIEUWKERK.
THEODORE GUTCHEIS.

Witnesses:
  Albert K. Condit,
  George Albers.